July 21, 1931.  A. B. RAYMOND  1,815,799
PISTON
Filed Oct. 17, 1928

Inventor
ARTHUR B. RAYMOND
By Chas K. Davies
Attorney

Patented July 21, 1931

1,815,799

UNITED STATES PATENT OFFICE

ARTHUR B. RAYMOND, OF MONTCLAIR, NEW JERSEY

PISTON

Application filed October 17, 1928. Serial No. 313,064.

My present invention relates to an improved piston of the reciprocating type for use in internal combustion engines. While the piston of my invention is designed especially for use in connection with the internal combustion engine forming the subject-matter of my application for patent Serial No. 282,068 filed June 1, 1928, it will be understood that the piston may be used in other types of engines having one or more cylinders, to which the fuel mixture is supplied by suitable charge-forming devices.

In carrying out my invention I utilize a hollow piston that is comparatively light in weight; is so shaped as to permit the free and unobstructed entrance of the fuel charge to the chamber above the piston and cause an increased velocity of the fuel mixture as it is charged into the chamber. Means are also provided whereby the exhaust gases may be expelled from the cylinder in such manner as to practically clear the cylinder of these gases. In the structure of the piston means are provided whereby an even expansion under the head from combustion is insured without distorting the piston, and thus a smooth reciprocating movement of the piston is accomplished.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 3:
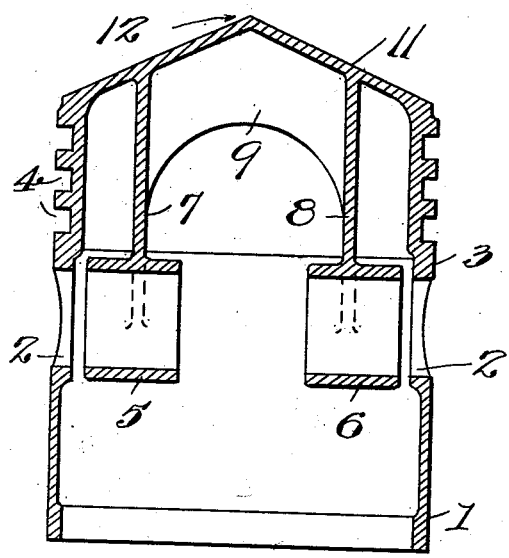
Fig. 3 is a sectional detail view at line 3—3 of Fig. 1.

The piston is of the usual hollow, cylindrical shape and is preferably fashioned from lynite, aluminum, or other similar material, with its skirt 1 open at the lower end and the piston is fashioned with diametrically opposed openings 2, 2 in its wall for use in assembling the piston pin and connecting rod, not shown.

The body 3 of the piston is fashioned with a plurality of annular, exterior grooves 4, for the reception and retention of piston rings, all of which are located above the piston pin which is journalled in a pair of spaced transversely extending bearing bosses or sleeves 5 and 6. These bosses are integral with a pair of webs 7 and 8 that depend from the head of the piston, and the parallel webs are joined by a transversely extending cross web 9 in the form of an arch. The webs are disposed transversely of the longitudinal axes of the two bosses and the bosses are axially alined with the openings 2, 2 and accessible means are thus provided for controlling the end play of the piston pin in the bosses without necessity of using set screws or other devices.

It will be noted that the outer edges of the bosses are free from the skirt of the piston, and that the inner edges of the bosses are spaced equidistant from the axial center of the piston, thus connecting the bosses solely with the head of the piston.

Figure 4:
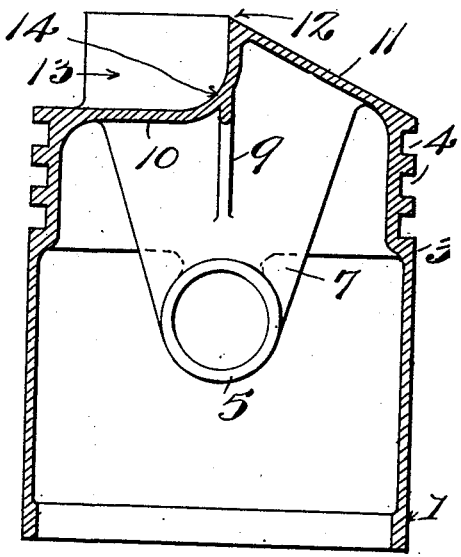
Fig. 4 is a sectional detail view at line 4—4 of Fig. 1.

The webs 7 and 8 as seen in Fig. 4, decrease in width or taper from the head 10 of the piston to the respective bosses, and the cross web 9 is arched between the two bosses 7 and 8, thus employing a minimum amount of material to secure a maximum bracing effect and strength in the interior of the piston structure.

Because of this arrangement in the interior structure of the hollow piston, the skirt of the piston is permitted to expand evenly and uniformly throughout its cylindrical or circumferential area and the bosses and webs that are free from the body of the piston receive a major portion of their heat with consequent expansion directly from the head of the piston from which they are supported.

Figure 1:
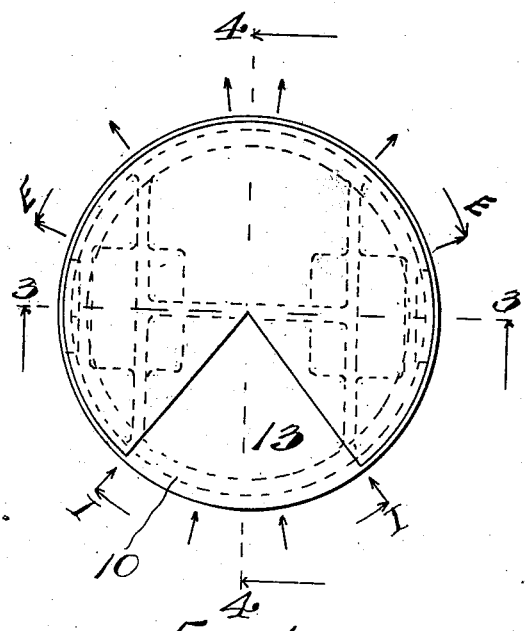
Figure 1 is a top plan view of a piston involving my invention, showing by dotted lines and arrows the movement of the fresh fuel charge, and the movement of the exhaust gases to the exhaust port of the cylinder.
Figure 2:
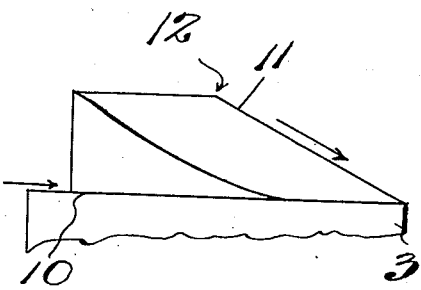
Fig. 2 is a side view at the top of the piston as seen from the right in Fig. 1.

The head 10 of the piston is fashioned with a pointed dome 11, the apex 12 of the dome being located centrally of the piston and a recess 13 is formed in the dome, which, as seen in Fig. 1 in horizontal position is of V-shape. The perpendicular flat walls of the recess (Fig. 4) merge into grooves 14 with the flat head portion 10 of the piston.

The exhaust gases are expelled on the scavenging stroke of the piston, as indicated by the arrows between the letters E, E the fresh fuel charge spreading out in mushroom fashion to assist in forcing the gases of combustion to the exhaust port. Upon reference to Fig. 1 it will be seen that the fresh fuel charge from the intake port of the cylinder, as indicated between the two lines I, I enters the recess 13 through an arc of approximately 78 degrees, while the gases of combustion are expelled from the space above the piston through a larger exhaust port between the lines E, E of approximately 146 degrees.

The recess 13 affords a free and unobstructed entrance of the fuel charges from the intake port; the dome of the piston baffles the charge, and the constricted formation of the recess increases the velocity of the incoming fuel charge, which, at the center of the compression chamber is deflected upwardly by the walls of the recess. The mixture as it rises through the center of the cylinder then spreads outwardly in a flaring formation to scavenge the upper portion of the cylinder and is in best possible condition for compression and combustion during the operation of the engine.

Having thus fully described my invention, what I claim as new and desire to secure by Letters Patent is:

1. A piston, a dome-shaped head therefor, and a V-shaped recess in said head having its apex coincident with the apex of the head and terminating in a deflecting face at the apex of the recess for turning the fuel charge along the axial line of the piston, whereby a fresh fuel charge is baffled and its velocity increased.

2. A piston having on its head guide walls on converging lines for constructing a fresh fuel charge as it flows toward the center of the piston, and guiding means for upwardly deflecting the constricted charge along the axial line of the piston.

ARTHUR B. RAYMOND.